US006988706B2

(12) United States Patent  
Seeley et al.

(10) Patent No.: US 6,988,706 B2
(45) Date of Patent: Jan. 24, 2006

(54) PIEZOELECTRIC MICROVALVE

(75) Inventors: Charles Erklin Seeley, Niskayuna, NY (US); Richard Joseph Saia, Schenectady, NY (US); Christopher James Kapusta, Duanesburg, NY (US); David Joseph Najewicz, Prospect, KY (US); Anis Zribi, Rexford, NY (US); Guanghua (George) Wu, Dublin, CA (US)

(73) Assignee: General Electric Company, Niskayuna, NY (US)

( * ) Notice: Subject to any disclaimer, the term of this patent is extended or adjusted under 35 U.S.C. 154(b) by 87 days.

(21) Appl. No.: 10/740,969

(22) Filed: Dec. 17, 2003

(65) Prior Publication Data
US 2005/0133751 A1 Jun. 23, 2005

(51) Int. Cl.
F16K 31/02 (2006.01)
(52) U.S. Cl. .................................. 251/129.06
(58) Field of Classification Search ........... 251/129.06, 251/129.01
See application file for complete search history.

(56) References Cited

U.S. PATENT DOCUMENTS

| | | | | |
|---|---|---|---|---|
| 4,617,952 A | * | 10/1986 | Fujiwara et al. | 251/129.06 |
| 5,012,835 A | * | 5/1991 | Ikehata et al. | 251/129.06 |
| 5,284,179 A | * | 2/1994 | Shikida et al. | 251/129.06 |
| 5,340,081 A | | 8/1994 | Wright | |
| 5,354,032 A | * | 10/1994 | Sims et al. | 251/129.06 |
| 5,488,255 A | * | 1/1996 | Sato et al. | 257/718 |
| 5,619,177 A | * | 4/1997 | Johnson et al. | 251/129.01 |
| 5,647,574 A | | 7/1997 | Mettner et al. | |
| 5,897,097 A | * | 4/1999 | Biegelsen et al. | 251/129.01 |
| 5,971,355 A | * | 10/1999 | Biegelsen et al. | 251/129.06 |
| 6,003,833 A | * | 12/1999 | Tasi et al. | 251/129.06 |
| 6,032,923 A | * | 3/2000 | Biegelsen et al. | 251/129.01 |
| 6,095,175 A | * | 8/2000 | Miller et al. | 251/129.06 |
| 6,114,794 A | | 9/2000 | Dhuler et al. | |
| 6,142,444 A | | 11/2000 | Kluge | |
| 6,149,123 A | | 11/2000 | Harris et al. | |
| 6,386,507 B2 | | 5/2002 | Dhuler et al. | |
| 6,450,204 B2 | | 9/2002 | Itzhaky | |
| 6,523,560 B1 | | 2/2003 | Williams et al. | |
| 6,557,820 B2 | | 5/2003 | Wetzel et al. | |
| 6,581,638 B2 | | 6/2003 | Frisch et al. | |
| 2002/0038990 A1 | | 4/2002 | Horner et al. | |
| 2002/0158551 A1 | | 10/2002 | Bindig et al. | |
| 2003/0076009 A1 | | 4/2003 | Hoffman et al. | |

OTHER PUBLICATIONS

Garnett Horner, John Teter and Eugene Robbins of Langley Research Center, "Flexible Piezoelectric Actuators," (www.nasatech.com/Briefs/July02/LAR15908.html), 2 pages.
"Basic Designs of Piezoelectric Positioning Elements," (www.physikinstrumente.com/tutorial/4_41.html), 2 pages.
Research Triangle Institute, "High Performance, Durable Actuators for Demanding Applications," on-line brochure (www.rti.org), 2 pages.

* cited by examiner

Primary Examiner—John Bastianelli
(74) Attorney, Agent, or Firm—Fletcher Yoder

(57) ABSTRACT

A piezoelectric microvalve and method for controlling a fluid flow through a piezoelectric microvalve are provided. The microvalve includes an inlet plenum and a flow directing structure for directing a fluid flow, wherein a first side of the structure is in fluid communication with the inlet plenum. The microvalve also includes a piezoelectric bending actuator comprising a flap portion responsive to a command signal for controlling a fluid flow through the flow directing structure. The microvalve further includes an outlet plenum in fluid communication with a second side of the flow directing structure.

18 Claims, 3 Drawing Sheets

PIEZOELECTRIC MICROVALVE

FIELD OF THE INVENTION

The present invention is generally related to piezoelectric actuators, and, more particularly, to a piezoelectric microvalve.

BACKGROUND OF THE INVENTION

Piezoelectric materials are known to change dimensions upon application of electric field. This phenomenon allows the use of piezoelectric material to be used as actuators in micro-electro-mechanical system (MEMS) devices. For example, such actuators have been used in microvalves, but it has been difficult to provide a piezoelectrically operated microvalve that can accurately control fluid flows at low pressures and high flow rates. In addition, known piezoelectric microvalves are typically complex, difficult to manufacture, and are, therefore, relatively expensive structures that may be susceptible to "stiction" of the moving parts and may not be suited for harsh environments, such as in high temperature applications.

BRIEF DESCRIPTION OF THE INVENTION

A microvalve is described herein as including an inlet plenum and a flow directing structure, wherein a first side of the flow directing structure is in fluid communication with the inlet plenum. The microvalve also includes a piezoelectric bending actuator including a flap portion responsive to a command signal for controlling a fluid flow through the flow directing structure. The microvalve further includes an outlet plenum in fluid communication with a second side of the flow directing structure.

DETAILED DESCRIPTION OF THE INVENTION

Figure 1:
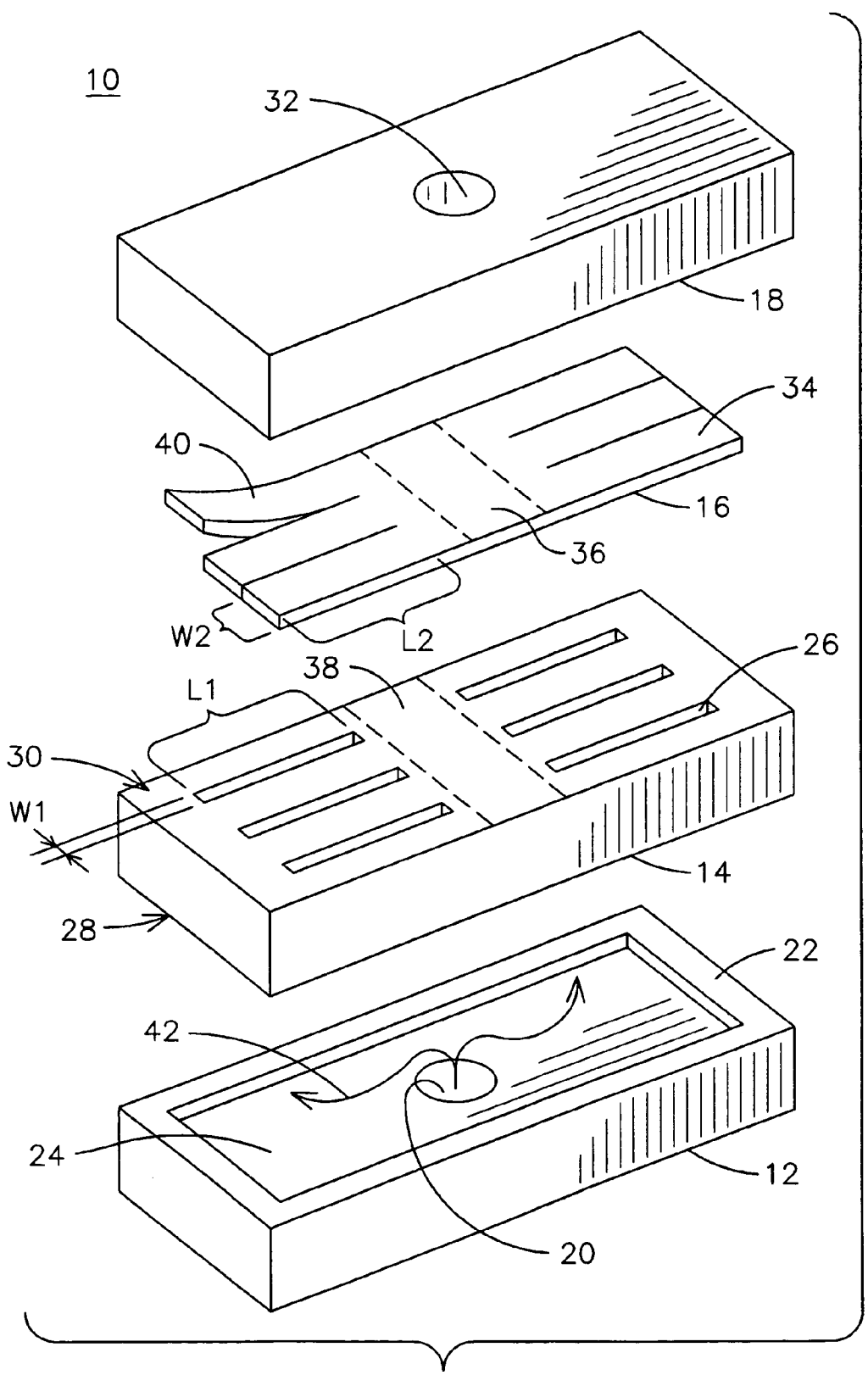
FIG. 1 is an exploded perspective view of an exemplary piezoelectric microvalve.

FIG. 1 is an exploded perspective view of an exemplary piezoelectric microvalve 10. In general, the microvalve 10 includes an inlet plenum 12, a flow directing structure 14, a piezoelectric bending actuator 16 and an outlet plenum 18. The inlet plenum may include a gas inlet opening 20 for receiving a fluid flow 42, such as a cooking gas, into the plenum 12. The inlet opening 20 may be configured to allow connection to a gas pipe, such as typically used in a gas cooking appliance. The inlet plenum 12 may also include a recessed area 24 for distributing gas in the plenum 12, and a lip 22 for sealing against an inlet side 28 of the flow directing structure 14. In an aspect of the invention, the lip 22 may include a gasket mounted between the inlet plenum 12 and the flow directing structure 14. The outlet plenum 18 may be similarly constructed and adapted for placing against an outlet side 30 of the flow directing structure 14. In a further aspect of the invention, the inlet plenum 12 and the outlet plenum 18 may be interchangeable parts, thereby decreasing the number of different parts required for manufacturing the microvalve 10. The inlet plenum 12 and the outlet plenum 18 may be formed from a metallic material, such as aluminum, and be manufactured using relatively low precision tolerances, provided the lip 22 is sufficiently flat to insure sealing against the flow directing structure. The outlet plenum 18 may also include a gas outlet opening 32 configured for connection to standard gas piping, for example, used in a gas cooking appliance to convey a cooking gas from a valve to a burner.

The flow directing structure 14 may be placed between the inlet plenum 12 and the outlet plenum 18 and may include at least one opening or orifice, such as an elongated slot 26, in fluid communication with the inlet plenum 12 and the outlet plenum 18. The flow directing structure 14 may be attached, such as by bonding, to the inlet plenum 12 around the periphery of the lip 22 to prevent fluid leakage. Accordingly, a fluid flow 42 entering the gas inlet opening 20 may flow into the recess 24 and may be distributed to flow through orifices, which may be configured as slots 26, extending through the flow directing structure 14. While an elongated slot 26 is depicted in FIG. 1, the invention is not limited to a slot configuration, and a variety of other orifice or opening geometries may be used.

The inventors of the present invention have experimentally determined that an orifice having a rectangular configuration, such as a elongated slot 26, in conjunction with the piezoelectric bending actuator 16, may provide finer control of a fluid flow 42 compared to other orifice configurations, such as a cylindrical orifice, having an equivalent cross-sectional area. In an aspect of the invention, the slot sizes among different slots 26 in the flow directing structure 14 may be varied to provide non-linear, or proportional, flow control through the flow directing structure 14. For example, the sizes of the slots 26 may be varied in width, length, or both, to provide a desired flow characteristic through the slot 26. For fine control of a fluid flow 42, a slot 26 may have a relatively smaller cross-section compared to a slot having a relatively larger cross-section sized for gross control of a fluid flow 42. In a further aspect, the flow directing structure 14 may be slightly convex on a side to which the bending actuator 16 is attached to facilitate sealing of the bending actuator over the slots 26.

The piezoelectric bending actuator 16 is positioned over the flow directing structure 14 and may be responsive to a command signal for unsealing the slot 26 to allow a fluid, such as a cooking gas, to flow through the slot 26. The piezoelectric bending actuator 16 may include one or more elongated flap portions 34 for sealing a respective slot 26. The piezoelectric bending actuator 16 may further include an attachment portion 36 for attaching the bending actuator to the flow directing structure 14 in a bond area 38. The bond area 38 may be located in a center portion of the flow directing structure 14 so that the elongated flap portion 34 extends away from the bond area 38 over a respective slot 26. For example, the attachment portion 36 may be adhered to the bond area 38 using a high temperature epoxy, or may be mechanically fastened. The piezoelectric bending actuator 16 may include a number of elongated flap portions 34 corresponding to a respective number of slots 26 in the flow directing structure 14, each portion 34 independently controllable for providing individual flow control through each slot 26. The flap portion 34 may include a flap periphery greater than an orifice, or slot, periphery to ensure that the slot is sealed against leakage when the flap portion 34 rests against the flow directing structure 14. In a form of the invention, the bending actuator 16 is attached to the outlet side 30 of the flow directing structure 14. In another form, the bending actuator 16 is attached to an inlet side 28 of the flow directing structure 14 so that the gas pressure in the inlet plenum 12 may act to hold the elongated flap portions 34 of the bending actuator 16 against the slots 26, for example, in an unenergized state, to seal each of the slots 26. Each elongated flap portion 34 of the piezoelectric bending actuator 16 may be responsive to a control signal, such as application of an electric field which may cause the elongated flap portion 34 to bend away from the respective slot 26, thereby allowing a fluid to flow through the flow directing structure 14 into the outlet plenum 18 to exit the microvalve 10 at the gas outlet opening 32. For example, the bent elongated flap portion 40 shown in FIG. 1 illustrates how an elongated flap portion 34 may be bent away from a slot 26 to allow a fluid to flow past the bent elongated flap portion 34. In an aspect of the invention, the deflection of the bending actuator 16 may be limited by the depth of recess 24. In another aspect, the bending actuator 16 may be configured to seal the slot 26 when not energized, thereby providing a failsafe closed position.

Each elongated flap portion 34 of the piezoelectric bending actuator 16 may be controlled in a continuously variable mode, or a two-state, or "digital" mode. In one aspect, for example, a continuously variable energizing voltage may be used to control an extent to which the flap 34 is bent away from a respective slot 26 so that the amount of fluid flowing through the slot 26 varies corresponding to the amount the flap 34 is bent away from the slot 26. In another aspect, the flap 34 may be controlled in a digital mode so that the flap 34 either seals the respective slot 26 in an "off" position, or the flap 34 is bent to a desired fixed or "on" position to allow a fluid to flow through the slot 26 at a fixed rate. Accordingly, total fluid flow through the microvalve 10 may be controlled by varying the number of slots 26 that are opened and the number of slots 26 that are closed. For example, a relatively low flow may be provided by opening one slot 26, while a relatively high flow may be provided by opening all the slots 26. In addition, the bending actuator 16 may be driven in a pulsed energizing mode, such as in a pulse width modulated (PWM) mode.

Figure 2:
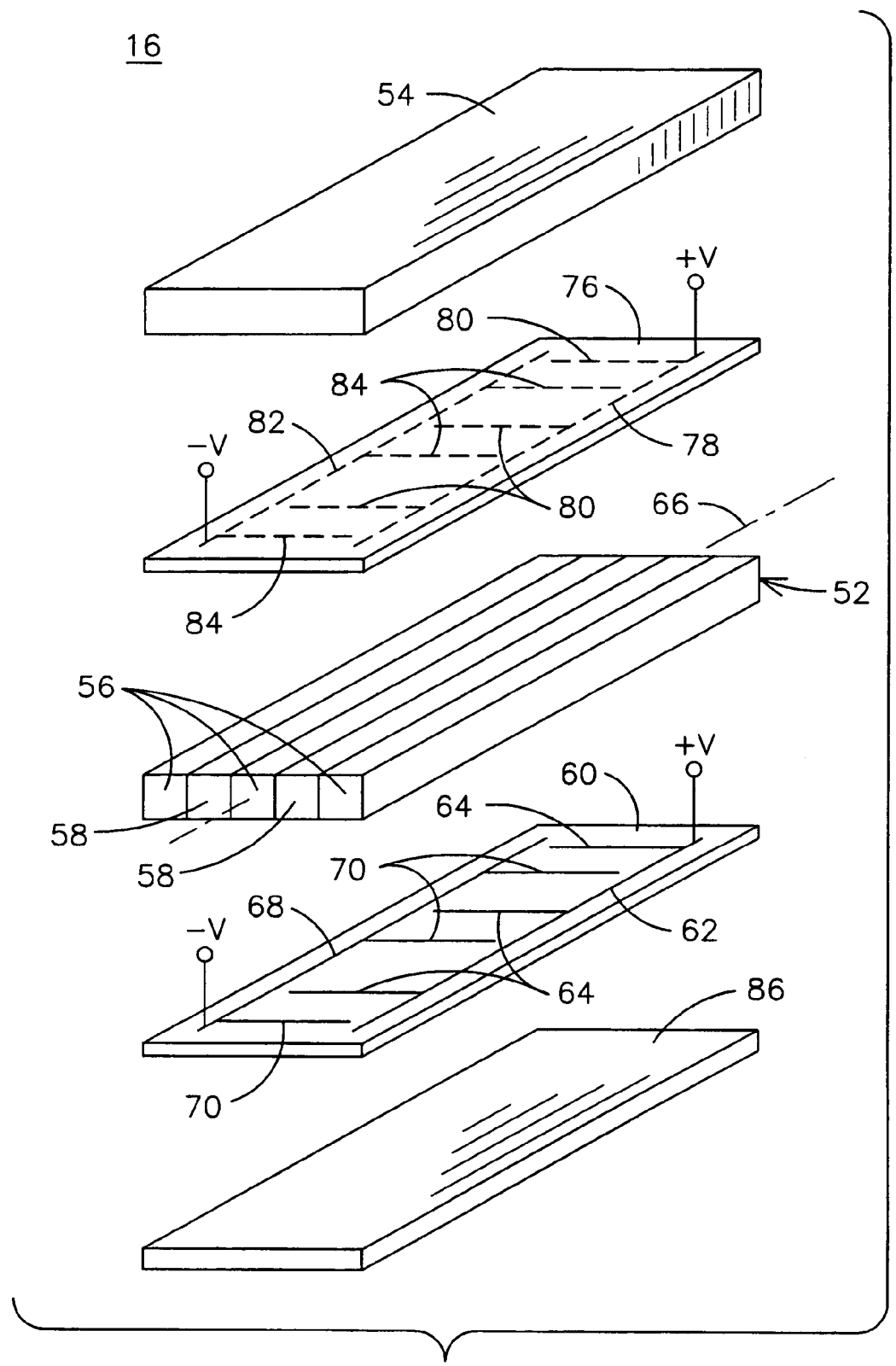
FIG. 2 is an exploded perspective view of an exemplary piezoelectric bending actuator.

FIG. 2 is an exploded perspective view of an exemplary piezoelectric bending actuator 16. In general, the piezoelectric bending actuator 16 includes a composite piezoelectric layer 52, a first electrode layer 60 positioned adjacent one side of the piezoelectric layer 52, a second electrode layer 76 positioned adjacent and opposite side of the piezoelectric layer 52, and a backing layer 54, such as a glass/epoxy compound, attached to at least one side of the piezoelectric layer 52. The piezoelectric bending actuator 16 may include a polymer layer 86, such as a room temperature vulcanizing (RTV) silicone, attached to a side of the actuator 16 facing the flow directing structure 14 when the actuator 16 is attached to the flow directing structure 14.

As understood in the art, an elongation of a piezoelectric layer 52, such as in a direction with a longitudinal axis 66, may be induced by application of an electric field. By attaching the piezoelectric layer 52 to the backing layer 54, such as a high temperature polymer, exhibiting little or no elongation affect relative to the piezoelectric layer 52, the actuator 16 may be bent in a direction towards the backing layer 54 as a result of the piezoelectric layer 52 being elongated with respect to the backing layer 54.

In an aspect of the invention, the piezoelectric layer 52 may include a plurality of piezoelectric members 56 held spaced apart by a plurality of spacing members 58. The piezoelectric members 56 may be formed, for example, from lead zirconate titranate (PZT), and the spacing members 58 may be formed from a polymer, such as a high temperature thermoplastic, for example, Ultem®. It has been demonstrated that a composite structure provides advantages over monolithic piezoceramics, such as inhibiting crack formation, and thus enhancing damage tolerance and longevity of the element 16. In a further aspect of the invention, the piezoelectric members 56 and the spacing members 58 may be rectangular in cross section, and may be oriented in a longitudinal direction parallel with the longitudinal axis 66. In another aspect, a size ratio, such as a cross sectional ratio, between the piezoceramic members 56 and the spacing members 58 may be selected to achieve a desired stiffness of the element 16. For example, the size ratio of piezoceramic members 56 to spacing members 58 may be relatively small, resulting in a less stiff layer 52, or the size ratio may be relatively large, resulting in a more stiff layer 52. In yet another aspect the invention, the piezoceramic members 56 may be held spaced apart in a matrix, such as a polymer matrix.

The first electrode layer 60 may include a positive electrode 62 comprising a set of spaced apart electrode fingers 64 extending in direction perpendicular to the longitudinal axis 66 of the piezoelectric bending actuator 16. The first electrode layer 60 may also include a negative electrode 68 having a set of spaced apart electrode fingers 70 extending in direction perpendicular to the longitudinal axis 66 and interdigitated with the set of fingers 64 of the positive electrode 62.

The second electrode layer 76 may include a positive electrode 78 comprising a set of spaced apart fingers 80 extending in direction perpendicular to the longitudinal axis 66. The second electrode layer 60 may also include a negative electrode 82 having a set of spaced apart fingers 84 extending in direction perpendicular to the longitudinal axis 66 and interdigitated with the set of fingers 80 of the positive electrode 78. In an aspect of the invention, the electrode layers 60, 76 may be formed on a polymer, such as Kapton®, instead of being formed on the piezoelectric layer 52 as in conventional piezoelectric actuator construction techniques. In another aspect, the electrodes 62, 78 may be encapsulated in a high temperature polymer, such as Ultem®. In an aspect of the invention, the second positive electrode layer 76 is vertically aligned with the first electrode layer 60 (that is, the negative electrodes 68, 82 are vertically aligned and the positive electrodes 62, 78 are vertically aligned) so that piezoelectric coupling occurs along the longitudinal axis 66 of the piezoelectric layer 52, advantageously resulting in improved bending performance. In yet another aspect, two or more layers, including at least a first electrode layer 60, a piezoelectric layer 52, and a second electrode layer 76, may be stacked to form a polymorph actuator.

Figure 3:
FIG. 3 shows a graph of exemplary flow rates through a microvalve orifice versus deflection of a bending element controlling flow through the orifice.

An exemplary microvalve, such as for use in a gas cooking appliance, may be constructed as shown in FIGS. 1 and 2 and operated as follows. The microvalve may include twelve orifices configured as slots, each slot having a width W1 of 0.01 inches and a length L of 0.25 inches. The bending element of the microvalve may have twelve elongated flap portions, each flap portion having a length, L2, of 0.5 inches, and width, W2, of 0.08 inches. Each elongated flap portion may be centered over the respective slot to ensure the periphery of the slot is evenly overlapped by the periphery of the flap to provide consistent sealing of the slot. The bending actuator may be controlled, such as by applying a voltage, to bend, or deflect, the bending actuator away from the slot to allow a fluid to flow through the slot. For example, FIG. 3 shows a graph of exemplary flow rates through a microvalve orifice configured as a slot versus deflection of a bending element controlling flow through the orifice. The deflection may be measured perpendicularly from the bent elongated flap portion to an outlet side of the flow directing element at an end of the slot opposite a bond area. It has been experimentally determined that a voltage of approximately 100 volts will deflect the elongated flap portion away from the end of the slot by approximately 0.006 inches, allowing a flow of approximately 0.26 cubic feet per minute (CFM).

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A piezoelectric microvalve comprising:
   an inlet plenum;
   a flow directing structure for directing a fluid flow, a first side of the structure in fluid communication with the inlet plenum;
   a piezoelectric bending actuator comprising a plurality of independently controllable flap portions extending from an attachment portion responsive to a command signal for controlling a fluid flow through the flow directing structure; and
   an outlet plenum in fluid communication with a second side of the flow directing structure.

2. The microvalve of claim 1, wherein the flow directing structure defines at least one orifice for directing the fluid flow.

3. The microvalve of claim 1, wherein the flow directing structure comprises an elongated slot for directing the fluid flow.

4. The microvalve of claim 3, the piezoelectric bending actuator further comprising a flap portion periphery greater than a slot periphery.

5. The microvalve of claim 3, wherein the flap portion is positionable over the slot to alternately seal and unseal the slot.

6. The microvalve of claim 1, the piezoelectric bending actuator further comprising:
   a piezoelectric layer;
   a first electrode layer positioned adjacent one side of the piezoelectric layer;
   a second electrode layer positioned adjacent an opposite side of the piezoelectric layer; and
   a backing layer attached to at least one side of the piezoelectric layer.

7. The microvalve of claim 6, further comprising a polymer layer attached to a side of the piezo electric bending actuator facing the flow directing structure.

8. The microvalve of claim 6, the piezoelectric layer further comprising a plurality of piezoceramic members held spaced apart by a plurality of spacing members.

9. The microvalve of claim 8, wherein a size ratio between the piezoceramic members and the spacing members is selected to achieve a desired stiffness of the structure.

10. The microvalve of claim 6, the piezoelectric layer further comprising a plurality of piezoceramic members held spaced apart in a polymer matrix.

11. The microvalve of claim 6, wherein the first electrode layer comprises a positive electrode comprising a first set of spaced apart electrode fingers extending in direction perpendicular to a longitudinal axis of the piezoelectric bending actuator and a first negative electrode having a second set of spaced apart electrode fingers extending in direction perpendicular to the longitudinal axis and interdigitated with the first set of fingers.

12. The microvalve of claim 6, wherein the second electrode layer comprises a second positive electrode comprising a third set of spaced apart fingers extending in direction perpendicular to the longitudinal axis, and a second negatively charged electrode having a fourth set of spaced apart fingers extending in direction perpendicular to the longitudinal axis and interdigitated with the third set of fingers, the second positive electrode layer vertically aligned with the first electrode layer.

13. The microvalve of claim 1, in combination with a cooking appliance.

14. A method of controlling a fluid flow through a piezoelectric microvalve comprising:
   providing an inlet plenum and an outlet plenum;
   providing a flow directing structure in fluid communication between the inlet plenum and outlet plenum;
   placing a piezoelectric bending actuator, comprising a plurality of independently controllable flap portions extending from an attachment portion responsive to a command signal for controlling a fluid flow; and
   bending independently, in response to the command signal, the flap portions of the actuator to allow a fluid flowing from the inlet plenum to flow to the outlet plenum.

15. A piezoelectric microvalve comprising:
   an inlet plenum;
   a flow directing structure for directing a fluid flow, a first side of the structure in fluid communication with the inlet plenum;
   a piezoelectric bending actuator comprising a flap portion responsive to a command signal for controlling a fluid flow through the flow directing structure and further comprising a plurality of piezoceramic members held spaced apart in a polymer matrix; and
   an outlet plenum in fluid communication with a second side of the flow directing structure.

16. The microvalve of claim 15, the piezoelectric bending actuator further comprising:
   a piezoelectric layer;
   a first electrode layer positioned adjacent one side of the piezoelectric layer;
   a second electrode layer positioned adjacent an opposite side of the piezoelectric layer; and
   a backing layer attached to at least one side of the piezoelectric layer.

17. The microvalve of claim 16, wherein the first electrode layer comprises a positive electrode comprising a first set of spaced apart electrode fingers extending in direction perpendicular to a longitudinal axis of the piezoelectric bending actuator and a first negative electrode having a second set of spaced apart electrode fingers extending in direction perpendicular to the longitudinal axis and interdigitated with the first set of fingers.

18. The microvalve of claim 16, wherein the second electrode layer comprises a second positive electrode comprising a third set of spaced apart fingers extending in direction perpendicular to the longitudinal axis, and a second negatively charged electrode having a fourth set of spaced apart fingers extending in direction perpendicular to the longitudinal axis and interdigitated with the third set of fingers, the second positive electrode layer vertically aligned with the first electrode layer.

* * * * *